(12) United States Patent
Lamy et al.

(10) Patent No.: US 6,992,804 B2
(45) Date of Patent: Jan. 31, 2006

(54) PART MADE OF TRANSPARENT MATERIAL AND HEADLIGHT LENS FOR VEHICLES

(75) Inventors: Patrick Lamy, Fleury sur Andelles (FR); Patrick Muzard, L.es Andelys (FR); François-Régis Leclercq, Rouen (FR)

(73) Assignee: Holophane, Lesandelys (FR)

( * ) Notice: Subject to any disclaimer, the term of this patent is extended or adjusted under 35 U.S.C. 154(b) by 52 days.

(21) Appl. No.: 10/399,147

(22) PCT Filed: Oct. 9, 2001

(86) PCT No.: PCT/FR01/03103

§ 371 (c)(1),
(2), (4) Date: Aug. 12, 2003

(87) PCT Pub. No.: WO02/31543

PCT Pub. Date: Apr. 18, 2002

(65) Prior Publication Data

US 2004/0051975 A1 Mar. 18, 2004

(30) Foreign Application Priority Data

Oct. 12, 2000 (FR) .......................................... 00 13083

(51) Int. Cl.
*G02B 5/32* (2006.01)
*G03H 1/18* (2006.01)
*B60Q 1/04* (2006.01)
*F21V 13/00* (2006.01)

(52) U.S. Cl. ............................... 359/3; 359/15; 359/19; 362/507; 362/511; 362/520; 362/538

(58) Field of Classification Search .................... 359/1, 359/15, 16, 19, 20, 3, 8, 570; 362/487, 507, 362/511, 520, 538
See application file for complete search history.

(56) References Cited

U.S. PATENT DOCUMENTS

| | | | | |
|---|---|---|---|---|
| 4,249,232 A | * | 2/1981 | Dick | 362/547 |
| 4,288,861 A | * | 9/1981 | Swainson et al. | 365/127 |
| 4,722,037 A | * | 1/1988 | Davis | 362/231 |
| 6,122,080 A | | 9/2000 | Ogata | |
| 6,446,467 B1 | * | 9/2002 | Lieberman et al. | 65/17.2 |

FOREIGN PATENT DOCUMENTS

| | | | |
|---|---|---|---|
| EP | 0 584 547 A1 | | 3/1994 |
| EP | 0 738 904 A1 | | 10/1996 |
| EP | 0 870 655 A1 | * | 10/1998 |
| FR | 2 770 617 A1 | | 5/1999 |
| JP | 10-083707 A | * | 3/1998 |
| JP | 2000-033263 | * | 2/2000 |
| JP | 2000-056112 A | * | 2/2000 |

OTHER PUBLICATIONS

A. Yu, et al., "Microstructuring with femtosecond laser inside silica glasses", CLEO '99, Conf. on Lasers and Electro–Optics, summaries of papers presented at the conf. on, May 23–28, 1999, pp. 356–357.*
K. Miura, et al., "Photowritten optical waveguides in various glasses with ultrashort pulse laser", Appl. Phys. Lett. vol. 71, No. 23, pp. 3329–3331, Dec. 8, 1997.*
E.N. Glezer, et al., "Ultrafast–laser driven micro–explosions in transparent materials", Appl. Phys. Lett. vol. 71, No. 7, pp. 882–884, Aug. 18, 1997.*
E.G. Behrens, et al., "Optical Applications of Laser–induced Gratings in EU Doped Glasses", *Applied Optics*, Apr. 10, 1990, vol. 28, No. 11, pp. 1619–1624.
Translation of International Preliminary Examination Report for PCT/FR01/03103 dated Dec. 10, 2000.
International Search Report for PCT/FR01/03103 dated Jan. 15, 2002.

* cited by examiner

*Primary Examiner*—John Juba, Jr.
(74) *Attorney, Agent, or Firm*—Sughrue Mion, PLLC

(57) ABSTRACT

A part (1) made of transparent material that allows visible light waves to pass therethrough, said part comprising outer faces (11, 12) defining a solid body (10) made of transparent material, the part being characterized in that it further comprises light diffracting means (14) situated inside the solid body (10) at a distance from the outer faces (11, 12).

15 Claims, 1 Drawing Sheet

PART MADE OF TRANSPARENT MATERIAL AND HEADLIGHT LENS FOR VEHICLES

BACKGROUND OF THE INVENTION

Field of the Invention

The present invention relates to a part made of transparent material, and more particularly to a vehicle-headlight lens, which is merely a part made of a transparent material that allows visible light waves to pass therethrough and that presents determined optical characteristics. Vehicle-headlight lenses are usually designed to be mounted in front of a light source inside a headlight housing.

BACKGROUND

In order to modify the optical characteristics, in particular the diffraction characteristics, of a part made of transparent material or of a vehicle-headlight lens, or in order to impart optical characteristics thereto, it is known to modify the surface state of said part or said lens so as to impart thereto an outer profile or pattern favoring diffraction of the light passing therethrough. This type of surface treatment is also used for purely esthetic purposes on parts having purely decorative use. In other words, it is known to treat the outer surface of parts made of transparent material or of a vehicle-headlight lens for a functional and/or decorative purpose.

To produce this special surface state, several techniques exist. A first technique consists in producing this surface state by molding, in particular while molding the part or the lens. To do this, the mold elements used for molding parts or lenses must define special imprints capable of producing the desired surface state. However, that type of molding technique presents technical drawbacks, in particular a lack of constancy or of quality as a result of the mold elements aging, wearing, or else becoming clogged. It has been observed that the desired surface state varies over time, or each time the mold elements are cleaned. With that molding technique, it is therefore practically impossible to ensure constant surface quality for parts made of transparent material or for vehicle-headlight lenses.

A second technique used to produce such surface states consists in machining the part or the lens after it has been molded. Once again, it is difficult to ensure that surface state remains of constant quality. This results from the facts that abrasives are used to perform the machining, and that the quality of the surface states depends directly on the grain size of the abrasives which vary not only over time but also from one batch of abrasives to another. It has been observed that a very small difference in the grain size of the abrasives creates a major difference in the desired surface states.

Furthermore, all surface-state treatments inevitably create irregularities or discontinuities in the surface of the part or of the lens, which favor the accumulation of dirt which significantly degrades the optical or decorative qualities of the part or of the lens.

An object of the present invention is to remedy the above-mentioned drawbacks of the prior art in general terms by defining a part made of transparent material, and more particularly by defining a vehicle-headlight lens, in which optical qualities, and in particular diffraction, are constant over time and from one part or from one lens to another. Furthermore, it must be possible to produce the part or the lens easily and at low cost.

SUMMARY OF THE INVENTION

To do this, the present invention proposes firstly a part made of transparent material that allows visible light waves to pass therethrough, said part comprising outer faces defining a solid body made of transparent material, the part being characterized in that it further comprises light diffracting means situated inside the solid body at a distance from the outer faces. The part can be made of glass or of a plastics material such as polycarbonate or methacrylate. The diffracting means can advantageously be constituted by point micro-deteriorations of the solid body which can, for example, be produced by a method of bombardment using laser radiation. When the part is made of glass, the point micro-deteriorations are in the form of microsplinters as a result of the massive point supply of energy coming from the laser radiation. In the case of a part made of plastics material, the point micro-deteriorations are in the form of micromelts as a result of the massive supply of energy coming from the laser radiation.

Naturally, the micro-deteriorations can be produced by using techniques other than the laser radiation technique.

By localizing the diffracting means inside the transparent part, out of contact with the outer surfaces thereof, parts can be produced having a perfectly smooth surface state such that they do not trap dirt. Furthermore, with such a laser bombardment method, a quality and a durable constancy of the diffracting means contained inside the part is ensured.

The part can be a purely decorative part, which may optionally be illuminated, and for which the diffracting means are used to create a decorative or esthetic pattern that can be seen directly inside the transparent part.

The transparent part can also be a functional part for which the diffracting means are used to deflect a portion of an incident light ray. For example, the diffracting means included within the part can serve to illuminate a zone that is otherwise quite dark.

The invention also provides a vehicle-headlight lens designed to be mounted in front of a light source in a headlight housing, said lens comprising outer faces defining a solid body made of transparent material, the lens being characterized in that it further comprises light-diffracting means situated inside the solid body at a distance from the outer faces. The lens can equally well be made of glass or of plastics material such as polycarbonate or methacrylate. The diffracting-means are advantageously constituted by point micro-deteriorations of the solid body of the lens, obtained, for example, by a method of bombardment using laser radiation.

The invention finds an advantageous application in the case of a vehicle-headlight lens for which optical and photometric properties are of greatest importance. Lenses are commonly used in vehicle headlights. The lens is used in association with a light source and a mask interposed between the light source and the lens. The purpose of the mask is to provide a cut-off in the emitted light beam. However, the cut-off made by the mask in the light beam is relatively sharp, and the light beam presents a very low, indeed practically zero intensity above said cut-off.

The fact that the light beam presents very low intensity above the cut-off can significantly hinder a driver who tries to see overhead information, e.g. on motorway signs.

Furthermore, regulations require a minimum light level in a "porch" zone, i.e. above the cut-off of the emitted light beam.

It is therefore necessary to illuminate the zone situated above the cut-off slightly, by reducing the contrast at the cut-off by spreading out the contrast gradient, so that the driver and the other users are not hindered.

Vehicle-headlight lenses which aim to achieve this object already exist in the prior art. To do this, surface treatments are performed using molding or machining techniques such as those described above with reference to the prior art. By way of example, document FR 2 770 617 can be mentioned which describes a lens having a convex front face that comprises a series of curved surfaces that are capable of deflecting a portion of the light beam. The curved surfaces are formed together with the lens itself by molding, and consequently suffer from the above-mentioned drawbacks, namely: aging, wear, and clogging of the mold elements used to form the lens.

The present invention solves all those problems given that the diffracting means do not affect the outer surface of the lens, and given that they are also produced by a method enabling a constant quality to be ensured therefor. The principle of the invention resides in the fact that the diffracting means are not formed outside the lens.

In an embodiment enabling the above-mentioned photometric criteria to be achieved, the diffracting means extend in the solid body in a pattern favoring the diffraction of light towards a zone situated above a plane passing through the mid-plane of the lens when it is in place in the headlight housing, i.e. in the zone situated above the cut-off.

In addition or in a variant, the diffracting means extend in the solid body in a pattern forming a waveguide for an incident light. The lens, in addition to being illuminated by the light source for the purpose of illuminating the roadway, can be illuminated by an additional source emitting incident light which propagates in the waveguide formed by the pattern of the diffracting means. By way of example, the additional light source can be illuminated while the main light source is turned off so as to impart an attractive esthetic effect to the lens, and more generally to vehicle headlights.

The lens is preferably an elliptic-type lens comprising a plane rear face and a convex front face. The light source is thus placed perpendicularly to the rear face and the incident light is emitted parallel to the plane of the rear face.

BRIEF DESCRIPTION OF THE DRAWINGS

The invention is described below in greater detail with reference to the accompanying drawing showing, by way of non-limiting example, an embodiment of the invention.

In the figures.

DETAILED DESCRIPTION OF PREFERRED EMBODIMENTS

Figure 1:
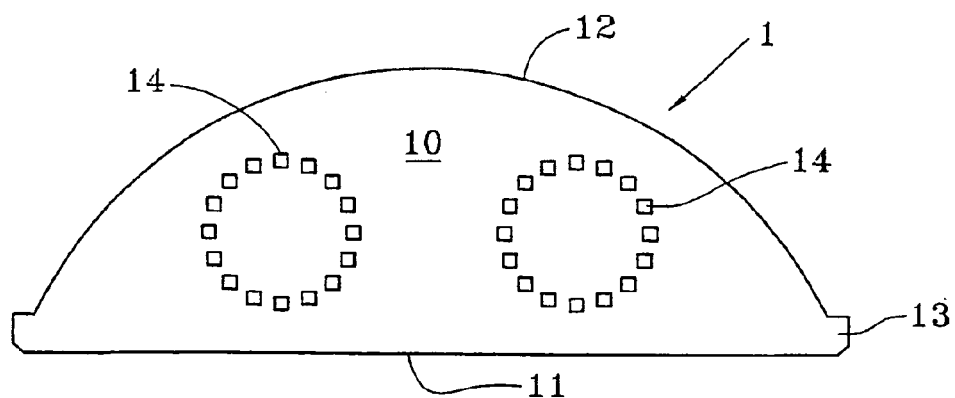
FIG. 1 is a view in vertical cross-section through a vehicle-headlight lens of the invention.
Figure 2:
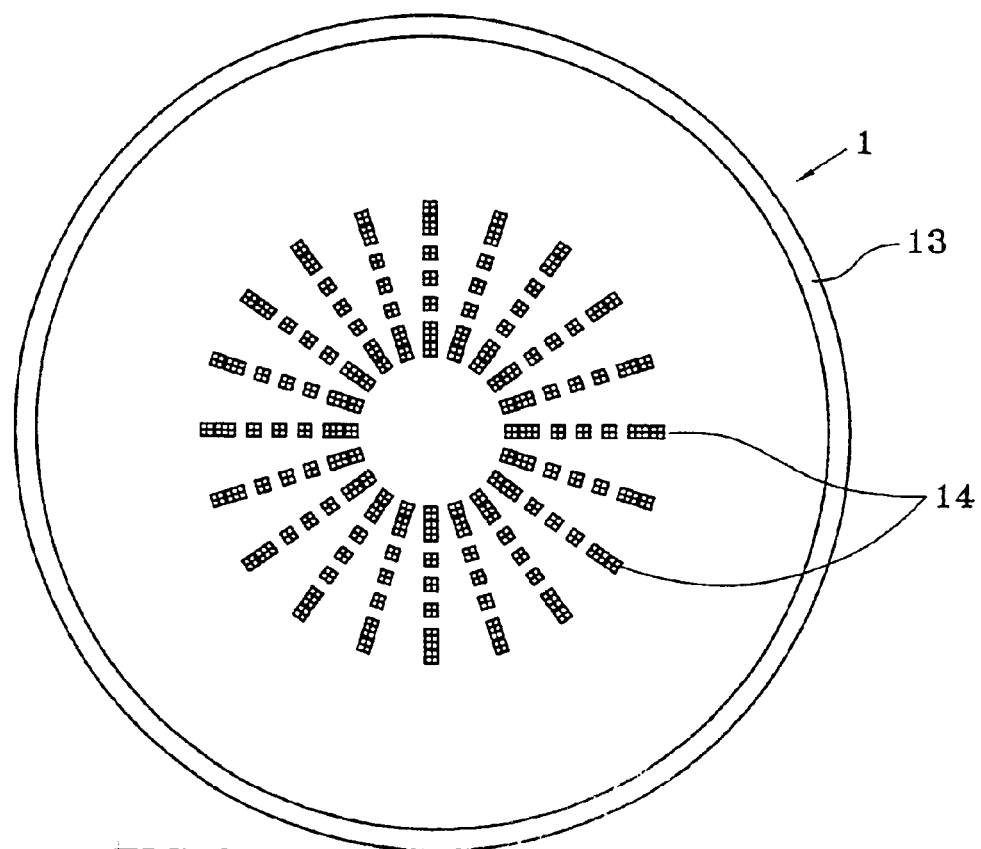
FIG. 2 is a plan view of the FIG. 1 lens.

The embodiment used to illustrate the present invention is a vehicle-headlight lens, but some other part made of transparent material could equally well have been used.

The vehicle-headlight lens shown in the drawing is an elliptic-type lens presenting a circular plane rear face 11 and a convex front face 12 connected to the rear face 11 by a rim 13 which serves to fix the lens in a vehicle-headlight housing. The faces 11 and 12 define a solid body 10 which is entirely solid.

The solid body is preferably in a single piece and is not constituted by strata or agglomerations.

The lens can be made of any transparent material that is able to withstand the heat emitted by the light source of the vehicle headlight. In particular, the lens can be made of glass or of a plastics material such as polycarbonate or methacrylate.

If the lens is made of glass, it can be made from a single drop of molten glass. The resulting solid body is thus perfectly homogeneous.

In the invention, diffracting means for diffracting visible light are formed inside the lens, i.e. in the solid body 10. The diffracting means 14 do not come into contact with the outer surfaces 11 and 12 of the lens 1. Nevertheless, a fraction of the diffracting means could also be situated on the outer faces 11 and 12. However, a portion of the diffracting means must be situated at a distance from the faces 11 and 12. Indeed, it is preferable for the entire diffracting means to be situated at a distance from the faces 11 and 12.

The diffracting means are advantageously in the form of point micro-deteriorations of the sold body 10 of the lens. The point micro-deteriorations 14 can be produced by means of a forming method using laser radiation during which the lens is subjected to point laser radiation that can be displaced and that can be varied in intensity so as to form a pattern of point micro-deteriorations.

The micro-deteriorations are in various forms as a function of the constituent material of the lens. When the lens is made of glass, for example, the micro-deteriorations are in the form of microsplinters obtained by the massive concentration of energy supplied by the laser radiation. Alternatively, when the lens is made of plastics material, the point micro-deteriorations are in the form of micromelts.

The diffracting means can extend in the solid body in a pattern enabling a functional and/or esthetic result to be obtained. The pattern made by the diffracting means can, for example, favor the diffraction of the light emitted by the light source of the vehicle headlight in such a manner as to illuminate even if only slightly an otherwise dark portion, e.g. the zone situated above the cut-off formed by the mask in a conventional vehicle headlight as explained above in relation to the prior art. The pattern of the diffracting means can, for example, direct light into the zone above the cut-off and thus soften the contrast at the cut-off.

Furthermore, the diffracting means can also extend in the solid body of the lens in a pattern forming a waveguide. By thus illuminating the lens sufficiently, it is possible to cause light to travel along the waveguide in such a manner as to make the pattern formed by the diffracting means even more visible. The result is thus purely esthetic and can be seen directly, but only when looking at the lens itself.

By way of example, it is possible to envisage a vehicle headlight having a housing that includes a main source of light designed to pass through the lens so as to illuminate the roadway, and a secondary light source, e.g. a light-emitting diode (LED), used purely to illuminate the lens for esthetic purposes by using the diffracting pattern as a waveguide. The main source is situated in conventional manner behind the plane face 11 of the lens, while the secondary light source can be installed in the plane, or parallel to the plane formed by the plane face 11.

What is claimed is:

1. A vehicle-headlight lens designed to be mounted in front of a light source in a headlight housing, said lens comprising outer faces defining a solid body made of transparent material, the lens being characterized in that it further comprises light diffracting means situated inside the solid body at a distance from the outer faces, and wherein the light diffracting means extends in the solid body in a pattern favoring the diffraction of light towards a zone situated above a plane passing through the mid plane of the lens when the lens is in place in the headlight housing.

2. A lens according to claim 1, in which the transparent material is selected from glass and plastics materials.

3. The lens according to claim 2, in which the plastic materials are polycarbonate or methacrylate.

4. A lens according to claim 1, in which the light diffracting means is constituted by point micro-deteriorations of the solid body.

5. A lens according to claim 1, in which the lens is an elliptic-type lens comprising a plane rear face and a convex front face, the light source being placed perpendicularly to the rear face and the incident light being emitted parallel to the plane of the rear face.

6. A vehicle-head light lens designed to be mounted in front of a light source in a headlight housing, said lens comprising outer faces determining a solid body made of transparent material, the lens being characterized in that it further comprises light diffracting means situated inside the solid body at a distance from the outer faces; and in which the light diffracting means extends in the solid body in a pattern forming a waveguide for an incident light.

7. A lens according to claim 6, wherein the transparent material is selected from glass and plastics materials.

8. A lens according to claim 6, wherein the light diffracting means is constituted by point micro-deteriorations of the solid body.

9. A lens according to claim 6, wherein the lens is an elliptic-type lens comprising a plane rear face and a convex front face, the light source being placed perpendicularly to the rear face and the incident light being emitted parallel to the plane of the rear face.

10. A vehicle-headlight lens assembly, comprising:

a headlight housing;

a vehicle-headlight lens comprising outer faces defining a body, the lens further comprising light diffracting portions inside the body at a distance from the outer faces; and p1 a light source;

wherein the vehicle-headlight lens is mounted in front of the light source; and wherein the diffracting portions extend in the body in a pattern favoring the diffraction of light towards a zone situated above a plane passing through the mid plane of the lens when the lens is in place in the headlight housing.

11. The vehicle-headlight lens assembly according to claim 10, wherein the body is solid.

12. The vehicle-headlight lens assembly according to claim 10, wherein the diffracting portions are micro-deteriorations formed by radiation.

13. A vehicle-headlight lens assembly, comprising:

a headlight housing;

a vehicle-headlight lens comprising outer faces defining a body, the lens further comprising light diffracting portions inside the body at a distance from the outer faces; and a light source;

wherein the vehicle-headlight lens is mounted in front of the light source; and wherein the lens is an elliptic-type lens comprising a plane rear face and a convex front face, the light source being placed perpendicularly to the rear face and the incident light being emitted parallel to the plane of the rear face.

14. The vehicle-headlight lens assembly according to claim 13, wherein the body is solid.

15. The vehicle-headlight lens assembly according to claim 13, wherein the diffracting portions are micro-deteriorations formed by radiation.

* * * * *